(12) United States Patent
Christ (10) Patent No.: US 12,292,281 B2
(45) Date of Patent: May 6, 2025

(54) METHOD AND DEVICE FOR CHARACTERIZING THE SURFACE SHAPE OF AN OPTICAL ELEMENT

(71) Applicant: Carl Zeiss SMT GmbH, Oberkochen (DE)

(72) Inventor: Regina Christ, Aalen-Unterkochen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 300 days.

(21) Appl. No.: 17/959,779

(22) Filed: Oct. 4, 2022

(65) Prior Publication Data

US 2023/0108466 A1 Apr. 6, 2023

(30) Foreign Application Priority Data

Oct. 4, 2021 (DE) .......................... 102021211172.6

(51) Int. Cl.
*G01B 9/02061* (2022.01)
*G01B 9/02* (2022.01)
(Continued)

(52) U.S. Cl.
CPC ..... *G01B 9/02061* (2013.01); *G01B 9/02055* (2013.01); *G01B 9/02059* (2013.01);
(Continued)

(58) Field of Classification Search
CPC ............ G01B 9/02039; G01B 9/02055; G01B 9/02059; G01B 9/02061; G01B 9/02087;
(Continued)

(56) References Cited

U.S. PATENT DOCUMENTS

| | | | |
|---|---|---|---|
| 5,982,490 | A | 11/1999 | Ichikawa et al. |
| 6,839,143 | B2 | 1/2005 | Otto |

(Continued)

FOREIGN PATENT DOCUMENTS

| | | | |
|---|---|---|---|
| DE | 10058650 A1 | | 5/2002 |
| DE | 102017217371 A1 | | 9/2017 |
| JP | 2007333575 A | * | 12/2007 |

OTHER PUBLICATIONS

German Office Action, with English translation, Application No. 10 2021 211 172.6, Jun. 28, 2022, 10 pages.

(Continued)

*Primary Examiner* — Michael A Lyons
(74) *Attorney, Agent, or Firm* — Edell, Shapiro & Finnan, LLC (57) ABSTRACT

In a method for characterizing the surface shape, the following steps are carried out iteratively: (A) calculating a first figure based on first measurements; (B) subtracting the first figure from first measured values, to determine a first test set-up error; (C) using the first test set-up error for calculating a corrected first figure,; (D) subtracting the corrected first figure from second measured values, to determine a second test set-up error; (E) using the second test set-up error for calculating a corrected second figure; (F) using the corrected second figure for correcting the first test set-up error by subtracting the corrected second figure from the first measured values, to determine a corrected first test set-up error; (G) using the corrected first test set-up error for calculating a first figure corrected once again; and (H) comparing the result with a convergence criterion and optionally repeating steps (A) to (H).

5 Claims, 4 Drawing Sheets

(51) Int. Cl.
  *G01B 9/02055*   (2022.01)
  *G01B 9/02056*   (2022.01)
  *G01B 11/24*   (2006.01)
  *G01M 11/00*   (2006.01)
  *G01M 11/02*   (2006.01)

(52) U.S. Cl.
  CPC ...... *G01B 9/02087* (2013.01); *G01B 11/2441* (2013.01); *G01M 11/005* (2013.01); *G01M 11/0271* (2013.01); *G01B 9/02039* (2013.01)

(58) Field of Classification Search
  CPC ............ G01B 11/2441; G01M 11/005; G01M 11/0271
  See application file for complete search history.

(56) References Cited

U.S. PATENT DOCUMENTS

| | | | |
|---|---|---|---|
| 7,158,914 B2 | 1/2007 | Kuhn | |
| 7,277,186 B2 * | 10/2007 | Seitz | G01J 9/02 |
| | | | 356/512 |
| 7,684,049 B2 * | 3/2010 | De Groot | G01B 9/0209 |
| | | | 356/497 |
| 11,118,900 B2 | 9/2021 | Riepenhausen et al. | |

OTHER PUBLICATIONS

Jongsma, Calvin. Introduction to Discrete Mathematics via Logic and Proof. Springer, 2019, p. 201.

\* cited by examiner

Fig. 1

Fig. 2
Conventional

Fig. 4

METHOD AND DEVICE FOR CHARACTERIZING THE SURFACE SHAPE OF AN OPTICAL ELEMENT

CROSS REFERENCE TO RELATED APPLICATIONS

The following disclosure is based on and claims the benefit of and priority under 35 U.S.C. § 119(a) to German patent application 10 2021 211 172.6, filed on Oct. 4, 2021, the disclosure of which is incorporated in its entirety into the present application by reference.

FIELD OF THE INVENTION

The invention relates to a method and a device for characterizing the surface shape of an optical element, in particular a mirror or a lens element of a microlithographic projection exposure apparatus.

BACKGROUND

Photolithographic methods and projection exposure systems are predominantly used nowadays for producing semiconductor components and other finely structured components, such as e.g. masks for microlithography. In this case, the structure pattern to be produced for a mask (also referred to as reticle) is illuminated with illumination light shaped by an illumination system and, with the aid of a projection lens, is projected on a reducing scale onto a functional layer of a substrate, said functional layer being coated with a light-sensitive layer. After the photosensitive layer has been developed, the structure corresponding to the structure pattern is transferred into the functional layer with an etching method.

In order to be able to produce ever finer structures, in recent decades, besides refractive and catadioptric optical systems which operate with light from the deep ultraviolet range (DUV) and have a high image-side numerical aperture NA of close to 1 or higher with and without immersion, optical systems have also been developed which operate with more moderate numerical apertures and attain high resolutions substantially by way of using the short wavelength of electromagnetic radiation from the extreme ultraviolet range (EUV), in particular with operating wavelengths in the range of between 5 nm and 30 nm, for example at operating wavelengths around 13.5 nm. Since radiation from the extreme ultraviolet range (EUV radiation) is absorbed by the optical materials that are transparent at longer wavelengths, mirror systems are used for EUV lithography.

The increase of the image-side numerical aperture tends to be accompanied by an enlargement of the required mirror areas of the mirrors used in the projection exposure apparatus. This in turn has the consequence that, in addition to manufacturing, testing the surface shape of the mirrors also becomes more and more technically demanding.

The testing of the surface shape of optical surfaces is carried out with the aid of interferometric measurements in the case of the methods considered in this application. In the case of an interferometric surface measurement, generally a measurement wave reflected by the surface to be examined is superimposed with a reference wave and the interference pattern generated in the process is captured. As a result, the actual shape of the surface that is accessible by measurement is compared interferometrically with a desired target shape for the purposes of testing. Deviations are quantified on the basis of interferograms in order to establish whether manufacturing tolerances are complied with or exceeded.

For historical reasons, the shape deviation of an optical surface of a test object from its target shape is also referred to as figure error or "figure"; therefore, figure measurement or figure testing is also often used as terminology for such methods. An aim of a figure measurement is for the figure, i.e. a test object error, to be characterized as accurately as possible.

One problem that occurs in the case of such measuring methods is that the set-up of an interferometer is not ideal in practice, but rather has deviations from an ideal set-up, e.g. because the optical components situated therein have deviations from the perfect surface shape and/or are not perfectly aligned. That may e.g. have the effect that the reference wave has errors because its wavefront does not correspond accurately enough to the target wavefront to be predefined. Such errors influence the measurement results as test set-up errors and may have the effect that the surface shape of the measured optical surface is characterized incorrectly.

A central objective when striving for test results with sufficiently few errors is therefore to reliably separate test object error and test set-up error from one another.

In some cases, a rotation averaging method is applied during a figure measurement in order to separate the test object and test set-up errors. The optical element to be examined (also called "test object" hereinafter) is rotated about a rotation axis in equidistant steps between individual measurements and interferograms are captured for a number of different rotational positions and are evaluated. The rotation averaging method is able to assign "concomitantly rotating" signatures to the test object, while "non-concomitantly rotating" errors are ascribed to the test set-up. That results in a very good estimation of the absolute errors. However, rotationally symmetrical portions and portions which have the symmetry of the number of rotational positions, the so-called wavinesses, cannot be captured. By way of example, in the case of a measuring method that uses twelve rotational positions for a rotation-averaged figure measurement, it is not possible to differentiate between a 12-fold symmetry of the test object error and a 12-fold symmetry of the test set-up error.

Experience shows that higher-order errors tend to be smaller than lower-order errors. They therefore contribute less to the error on the end product. Therefore, it is considered to be worthwhile to drive the waviness error to the highest possible orders (e.g. 100th order waviness). However, this necessitates measuring in the first instance a hundred or more rotational positions, which requires very much measurement time and machine time and thus contributes to higher costs on the end product.

DE 100 58 650 A1 describes a method for interferometrically measuring non-rotationally symmetrical wavefront aberrations on a test object which can be brought to a plurality of rotational positions progressively by rotation about a test object rotation axis. At least one measurement result is ascertained in each of the rotational positions. The measurement is carried out in at least two measurement series (M, N), wherein the measurement results (M1 . . . Mm, N1 . . . Nn) of each of the measurement series (M, N) are ascertained in rotational positions of the test object that are equidistant to one another in each case. Each of the measurement series (M, N) comprises a specific number n, m of measurements, where m and n are natural and mutually relatively prime numbers. Finally, all the measurement results are mathematically evaluated. This measuring method can produce an "N*M"-symmetrical waviness error very efficiently from "N+M" rotational positions. The method is based on the fact that it is possible to differentiate between the test object errors and test set-up errors with M-th order and N-th order wavinesses by forming the difference between an N-figure and an M-figure. For this purpose, the N-rotational position measurement or the M-rotational position measurement is corrected with the NM-figure formed. For a comparable number of measurement points, the method affords a higher absolute accuracy than the rotational position test explained above. Put another way, the method can afford an accuracy comparable to that of the rotational position test with a significantly smaller number of measurement points.

DE 10 2017 217 371 A1 describes another method for characterizing the surface shape of an optical element. In this method, too, numerous interferometric measurements are carried out on the test object, i.e. the optical element, each of which measurements involves recording an interferogram between a test wave emanating from a respective section of the optical element and a reference wave. Between these measurements the position of the optical element relative to the test wave is changed step-by-step by rotation about a test object rotation axis. The figure of the optical element is calculated on the basis of these measurements. The calculation is carried out iteratively in such a way that, in a plurality of iteration steps, the figure of the optical element is ascertained in each case by carrying out a forward calculation, each of these iteration steps being based in each case on a reference wave that was adapted on the basis of the preceding iteration step. The method is also suitable for testing large mirrors or the like since the method functions even if the entire surface area of the test object is not captured in a measurement, rather it is only possible to record subapertures that do not cover the complete area of the test object.

With the further development of optical systems for lithography, there are increasingly optical elements having a complex shape, the testing of which using conventional techniques is not possible or is no longer possible in an economically viable way. They include e.g. mirrors having a cutout or perforation which has a non-rotationally symmetrical shape and/or is not situated symmetrically with respect to a center of symmetry of the optical element.

SUMMARY

A problem addressed by the invention is that of providing a method of the generic type (with test object rotation) for characterizing the surface shape of an optical surface of an optical element, which method makes it possible, within relatively short total measurement times, to carry out reliable testing even if the surface to be tested is not rotationally symmetrical over the whole area in relation to an axis used as test object rotation axis during testing.

This problem is addressed, according to two formulations of the invention, with a method as claimed hereinbelow and with a device as claimed hereinbelow. Preferred developments are specified in various dependent claims. The wording of all the claims is incorporated by reference in the content of the description.

The method serves for characterizing the surface shape of an optical surface of an optical element. A figure test is thus possible therewith. The optical element can be e.g. a mirror or a lens element which, in the state mounted ready for use, is part of an optical system of a microlithographic projection exposure apparatus, for example of a projection lens. The optical element is incorporated as a test object in an interferometric test device in such a way that the surface to be tested is arranged completely within a measurement region of the test device. The term "test object" here denotes the optical element whose optical surface is intended to be tested with regard to its shape or with regard to shape deviations, i.e. denotes the "device under test".

A plurality of interferometric measurements are carried out on the test object in order to test whether the shape of the surface corresponds to a specification sufficiently accurately. In an interferometric measurement, a test wave emanating from the surface and a reference wave are superimposed or brought to interference, thereby giving rise to an interferogram containing information about the surface shape. From the intensity distribution of an interferogram, measured values can be ascertained, e.g. in the form of a wavefront or phase information, on which the further evaluation is then based.

The method provides test object rotation. That is to say that between the individual measurements the rotational position of the test object relative to the test device is changed by limited rotation of the test object about a test object rotation axis. As a result, the test object is measured in a plurality of different rotational positions. In an evaluation operation, the measured values derived from the interferograms are jointly evaluated in order to ascertain shape information for characterizing the surface shape of the optical surface.

Analogously to the method known from DE 100 58 650 A1, the method provides for carrying out at least two measurement series with different numbers of rotational positions. The first measurement series comprises a number of M first measured values that are ascertained by first measurements. The measured values are associated with M different equidistant rotational positions, between which there in each case is a rotation angle difference of 360°/M. Second measured values are captured in an analogous manner, which form a second measurement series containing measured values for N rotational positions. Between the rotational positions in which the second measured values are captured, there is in each case a rotation angle difference of 360°/N. The numbers M and N are relatively prime natural numbers.

This conventional method yields good results if the target shape of the surface is rotationally symmetrical with respect to an axis of symmetry, the latter is used as test object rotation axis and the surface to be tested has a virtually circular outer contour centered with respect to the test object rotation axis and is embodied over the whole area insofar as it has no gap, cutout or perforation that is not rotationally symmetrical with respect to the test object rotation axis. Such surfaces to be tested are referred to here as rotationally symmetrical over the whole area. When these conditions are present, the terminology used includes testing of "on-axis apertures".

Furthermore, the present invention also allows reliable tests of "off-axis apertures", that is to say on test objects whose surfaces to be tested are not rotationally symmetrical over the whole area. The steps proposed for this purpose are explained below.

An important difference between the method according to the claimed invention and the prior art mentioned above resides in the evaluation of the measurement results. The evaluation operation involves using an iterative evaluation method, i.e. a process of multiply repeating identical or similar evaluation steps in order to approach the sought end result step by step.

In a first step (A), a first figure is calculated on the basis of the first measurements. The first figure is a common concomitantly rotating figure of the first measurement series. The first figure contains shape information which is present substantially identically in the first measured values for all M rotational positions. That is based on the consideration that an error which is actually attributed to shape deviations on the test object is manifested in an identical way in all the rotational positions, but in each case at a different rotational position in relation to the test object rotation axis. The signature of this error in the interferograms thus rotates concomitantly with the test object. In this method step, however, rotationally symmetrical error portions and error portions having the symmetry of the number of rotational positions cannot be captured. Consequently, the result of method step (A) still contains the test object errors with M-th order waviness and also contributions attributed to the test set-up, i.e. test set-up errors.

In the subsequent step (B), the first figure described above is subtracted from the first measured values (i.e. from the raw data of the first measurement) in order to determine a first test set-up error. The latter contains common non-concomitantly rotating errors of the first measurement series. These include primarily errors attributed to a non-ideal alignment of the measurement set-up, e.g. wobble errors during the rotation of the test object. Furthermore, they include errors stemming from the fact that the reference wave actually used deviates from the reference wave ideally provided.

In a subsequent method step (C), the first test set-up error thus ascertained is used for calculating a corrected first figure. The latter results from the first measured values, i.e. the raw data of the first measurement, by subtraction of the first test set-up error.

In this application, the above-described sequence of method steps is also referred to as first cycle or M-cycle. By itself an M-cycle is not able to identify test object errors with M-th order waviness and test set-up errors with M-th order waviness because the underlying raw data (first measured values) are present at M rotational positions.

The claimed method makes it possible to separate the errors with M-th order waviness from the errors with N-th order waviness. For this purpose, then, in a somewhat shortened mode of expression, the corrected test object error with M-th order wavinesses (i.e. the reconstructed first figure) is fed into the reconstruction of the N rotational position cycle or processed there. There the raw data (second measured values of the second measurement series) only carry the test object error with N-th order waviness and the test set-up error with N-th order waviness. An M-th order waviness in this cycle is registered only by the correction of the M rotational position cycle and is suppressed by the reconstruction with N rotational positions. To put it another way, the test object error with M-th order waviness can thereby be separated from the test set-up error with M-th order waviness.

In a subsequent step, the results of the first measurement series and the results of the second measurement series are thus "married to one another" in a particular way. In accordance with one formulation of the invention, this is done in a method step (D) by subtracting the corrected first figure ascertained in step (C) from the second measured values in order to determine a second test set-up error. In this step, therefore, information from the M-cycle is introduced into the N-cycle.

In a step (E), the second test set-up error thus ascertained is then used to calculate a corrected second figure, which results from the second measured values, i.e. the raw data of the second measurement series, by taking into account the second test set-up error.

Afterwards, in step (F), the corrected second figure is used to correct the first test set-up error. This is done by subtracting the corrected second figure from the first measured values in order to determine the first test set-up error, now containing common non-concomitantly rotating errors of the first measurement series and of the second measurement series.

Afterwards, in a step (G), this corrected first test set-up error is used to calculate a first figure corrected once again.

After a reconstruction of the N rotational position cycle, this reconstruction result is then fed again as correction into the reconstruction of the M rotational position cycle. This leads to a correction or increasing suppression of the test object errors with N-th order waviness.

It is possible to run through this sequence of method steps iteratively until a sufficiently accurate result is present for the surface shape of the test object, that is to say e.g. until a specific convergence criterion is satisfied. A step (H) therefore comprises a comparison with a convergence criterion and repetition of the aforementioned steps (A) to (H) depending on the result of the comparison.

With multiply repeated, i.e. iterative, application of these method steps, the test object errors with M-th order waviness, the test object errors with N-th order waviness and also the test set-up errors with M-th order waviness and the test set-up errors with N-th order waviness are separated from one another better and better, such that only the common multiples, i.e. N*M, remain in the final result. This is analogous to this extent to the method from DE 100 58 650 A1 mentioned in the introduction.

However, in contrast thereto, a correction of the N-th order wavinesses and of the M-th order waviness will take place on the entire area swept by the test object since the results of M-cycle and N-cycle are computed alternately with one another in an iterative method. This computation is also referred to hereinafter as "stitching". This means, as a result, that information about the test set-up error can be ascertained for every part of the surface that was situated in the measurement region at any stage of the measurements. If, in the case of a specific measurement, i.e. in the case of a specific rotational position, no information is captured for a partial region of the measurement region (which would lead to "bad pixels" in this measurement), then the test set-up error can nevertheless be reconstructed as long as this region can be measured in any of the rotational positions.

What can thus be achieved by "stitching" is that no duplication of invalid image regions and/or averaging edges can arise. Therefore, this method is applicable even to test objects whose region of interest is not rotationally symmetrical over the whole area with respect to the test object rotation axis. This may be the case for example for mirrors containing an off-axis cutout in order to provide, in a multiply folded beam path, a vignetting-free passage for beams that pass between other mirrors of the optical system. Another example is surfaces of optical elements whose outer contour is not circular and centered with respect to the axis of symmetry of the nominally rotationally symmetrical surface shape, e.g. oval mirrors.

It may suffice to carry out only exactly two measurement series and to jointly evaluate their results. Some embodiments provide for carrying out three or more measurement series, e.g. three, four or five measurement series, and computing their results with one another. This enables possibly more accurate results to be attained at the expense of a longer measurement time.

BRIEF DESCRIPTION OF THE DRAWINGS

Further advantages and aspects of the invention are evident from the claims and from the description of exemplary embodiments of the invention, which will be explained below with reference to the figures.

DETAILED DESCRIPTION

Exemplary embodiments of a method according to the invention and of a measuring device according to the invention are explained below on the basis of the characterization of the surface shape of the optical surface of a mirror for a projection lens or an illumination system of a microlithographic projection exposure apparatus.

Figure 1:
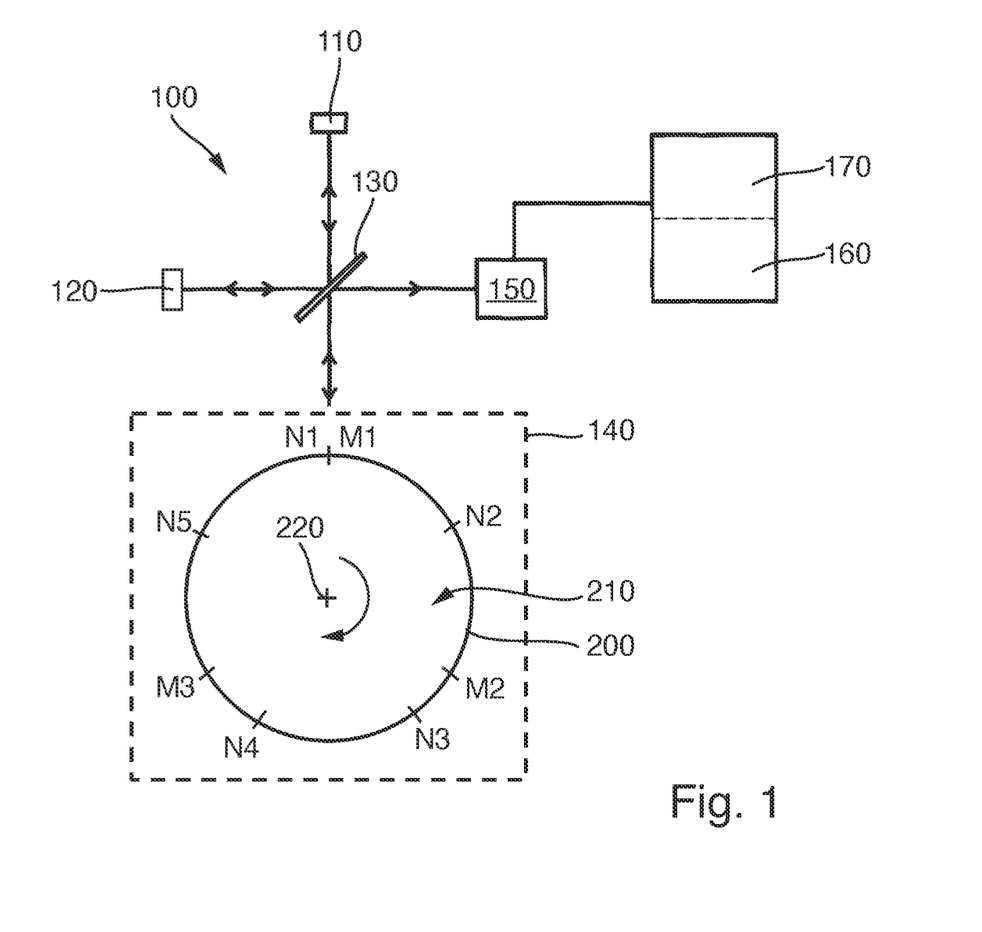
FIG. 1 schematically shows the set-up of an interferometric test device for characterizing the surface shape of an optical surface of a test object.

The method can be carried out by various interferometric test devices. FIG. 1 shows, in a highly schematic basic illustration, the set-up of a test device 100 for characterizing the surface shape of an optical surface 210 of a test object 200 in the form of an optical element. The test device is illustrated by way of example with an optical set-up in the manner of a Michelson interferometer. It can also operate according to other interferometer principles; for example, the test device can be configured as Fizeau interferometer. The test is based on measurement results of interferometric measurements, for which reason the test device 100 may also be referred to as measuring device 100.

The interferometric test device 100 includes, inter alia, a light source 110, a reference element 120, a beam splitter 130 and an apparatus 150 equipped with a detector, for capturing the interference patterns that arise. This apparatus can have e.g. a camera. The apparatus 150 is coupled to a control unit 160 containing an evaluation unit 170, which comprises, inter alia, a computer-based data processing unit, in which the evaluation operations for evaluating the measured values derived from the interferograms are carried out. The control unit 160 serves for coordinating and controlling operations of the automatic test device.

The test object is incorporated in a rotatably mounted test object holder in such a way that the surface 210 to be tested is arranged completely within a measurement region 140 of the test device. The test object holder is rotatable by way of the control unit in such a way that the test object can be rotated about a test object rotation axis 220 by predefinable angle increments and can be stopped in specific rotational positions.

The target shape of the surface 210 to be tested of the test object 200 is rotationally symmetrical (spherical or aspherical) with respect to an axis of symmetry of the surface. The test object is received such that this axis of symmetry corresponds as exactly as possible to the test object rotation axis.

Interferometric measurements are carried out on the test object, wherein an interferogram between a test wave emanating from the surface 210 and a reference wave emanating from the reference element is ascertained in each interferometric measurement. Between the measurements the rotational position of the test object relative to the test device is changed by limited rotation of the test object about the test object rotation axis 220. In an evaluation operation, the interferograms or the measured values derived therefrom are jointly evaluated in order to ascertain shape information for characterizing the surface shape of the optical surface.

In order to form a first measurement series, a number of M measurements are carried out. In this case, the M measured values are captured for M rotational positions (M1, M2, etc.) with a rotation angle difference of 360°/M. In order to form a second measurement series, N measured values (N1, N2, etc.) are captured for N rotational positions with a rotation angle difference of 360°/N. In this case, M and N are relatively prime natural numbers. The M measured values of the first measurement series are also referred to here as "first measured values", and the N measured values of the second measurement series are correspondingly also referred to as "second measured values". FIG. 1 illustrates the situation of rotational positions on the basis of the example of M=3 and N=5. In each measurement series, the rotational positions are arranged at equidistant distances or angular positions over a full rotation of the test object 200.

In terms of these general aspects the procedure according to the invention corresponds to the conventional method described in DE 100 58 650 A1. The method according to the invention, however, modifies said the conventional method in order to avoid certain specific disadvantages.

Figure 2:
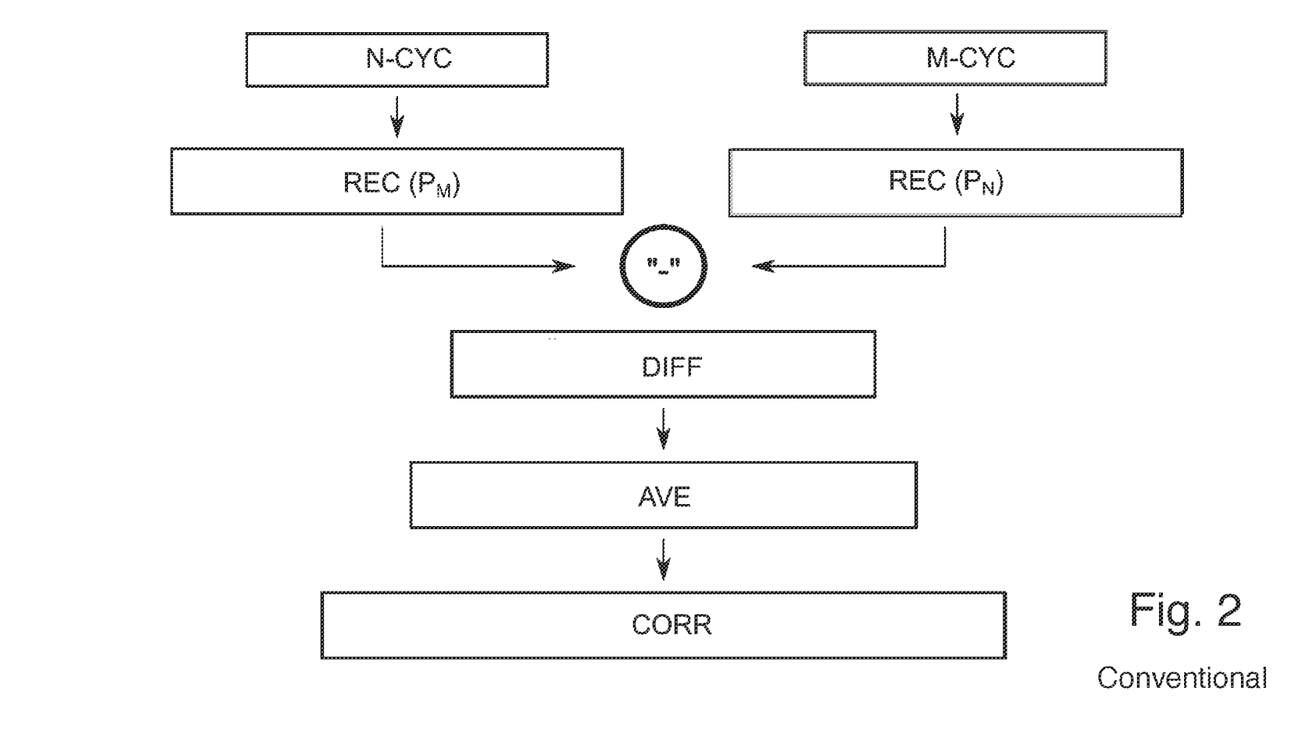
FIG. 2 shows an evaluation algorithm in a method in accordance with the prior art (PA)

In order to afford a better understanding, firstly the conventional method known from DE 100 58 650 A1 is explained here in greater detail. This conventional method is also referred to hereinafter as "N+M method". The algorithm underlying this conventional method is illustrated schematically in FIG. 2. The method involves firstly recording the measurement data or measured values for equidistant 360°/N rotational positions and 360°/M rotational positions. These series or cycles of measured value recordings are designated by N-CYC (for the N-cycle) and M-CYC (for the M-cycle), respectively, in FIG. 2. The respective raw data are then reconstructed in the respective steps REC($P_N$) and REC($P_M$) in each case to form a figure of the respective cycle. In FIG. 2, $P_N$ stands for the N-figure derived from the N-cycle, i.e. the reconstruction from N rotational positions. The same analogously applies to $P_M$, i.e. the figure from the M-cycle (N-figure). The reconstruction REC($P_N$) of the N rotational positions in order to calculate the figure PN can be represented as follows:

$$\text{Figure}_N = \text{Figure} + \text{Errors}^{rot} + \text{FigureSet-up}_N.$$

The same analogously applies to the M-cycle. In this case, the parameter "Errors$^{rot}$" includes the rotationally symmetrical test object and test set-up errors, i.e. errors which cannot be determined by rotation averaging. The parameter "FigureSet-up$_N$" denotes inseparable errors with N-th order waviness of test object and test set-up. The reconstructed figures PN and PM in each case contain the test object and test set-up errors with M-th order waviness.

These cannot be separated from one another owing to the limited number of rotational positions. One benefit of this "N+M method" consists in separating the respective test object and test set-up errors with N-th order waviness and M-th order waviness from one another with the reconstructed figures PN and PM with N-th order and M-th order waviness. What can be achieved thereby is that only the wavinesses of the lowest common multiple N*M are still present in the final result.

In order to achieve this aim, in a subsequent method step DIFF, firstly the difference between the two reconstructed figures is formed, which is represented by the symbol "-" in FIG. 2. This difference then carries the N-th order waviness and the M-th order waviness of the test object and of the test set-up error. The parameter CorrNM is calculated by difference formation, for which parameter it holds true that:

$$Corr_{NM}=FigureSet-up_M-FigureSet-up_N$$

In the subsequent step AVE, this difference formed is rotated in N equidistant 360°/N steps and the respective rotated differences are averaged. This is described by:

$$Corr_{NM\_N}=FigureSet-up_N+FigureSet-up_{N*M}$$

As a result, the M-th order waviness is suppressed by the averaging by the factor N. This yields a good approximation for the N-th order waviness of the test set-up error with residual errors of the N*M-th order waviness.

In the step CORR, this N-th order waviness can then be corrected by subtraction from the reconstructed N rotational position measurement. The correction of the Figure$_M$ can be described as follows:

$$Figure_{N*M}=Figure_M-Corr_{NM\_N}=Figure+Errors^{rot}+FigureSet-up_{N*M}$$

Only the test object and test set-up errors with N*M-th order waviness then remain in the final result, which errors cannot be separated from one another in this method.

According to the inventors' insights, a practical disadvantage of this method is that for certain test objects application of this N+M rotation averaging method can lead to large regions in the figure measurement result in which there are gaps in the measurement result. Therefore, this "traditional" N+M rotation averaging method is defined only for apertures that are rotationally symmetrical over the whole area. These apertures are also referred to here as "on-axis apertures". An on-axis aperture is present if, with respect to the test object rotation axis, the surface to be tested is rotationally symmetrical and embodied over the whole area (i.e. e.g. without off-axis gaps or cutouts).

However, there are many test object geometries in which the surface to be tested is not rotationally symmetrical over the whole area with respect to the test object rotation axis. One example thereof is mirror surfaces having off-axis and/or non-circular cutouts and/or having a non-circular outer boundary. These cases are referred to here as cases with an "off-axis aperture".

The inventors have recognized that the main problem of the limited applicability of the N+M rotational position method in the case of off-axis apertures resides in the used mediation of the test object and test set-up errors with N-th order waviness for determining the term CORR$_{NM\_N}$. By virtue of the fact that the full test set-up aperture is not measured in off-axis systems, the measurement image (depending on the shape of the test object), in varying proportions, consists of invalid pixels, i.e. image elements to which no area elements of the measured area are assigned.

Figure 3:
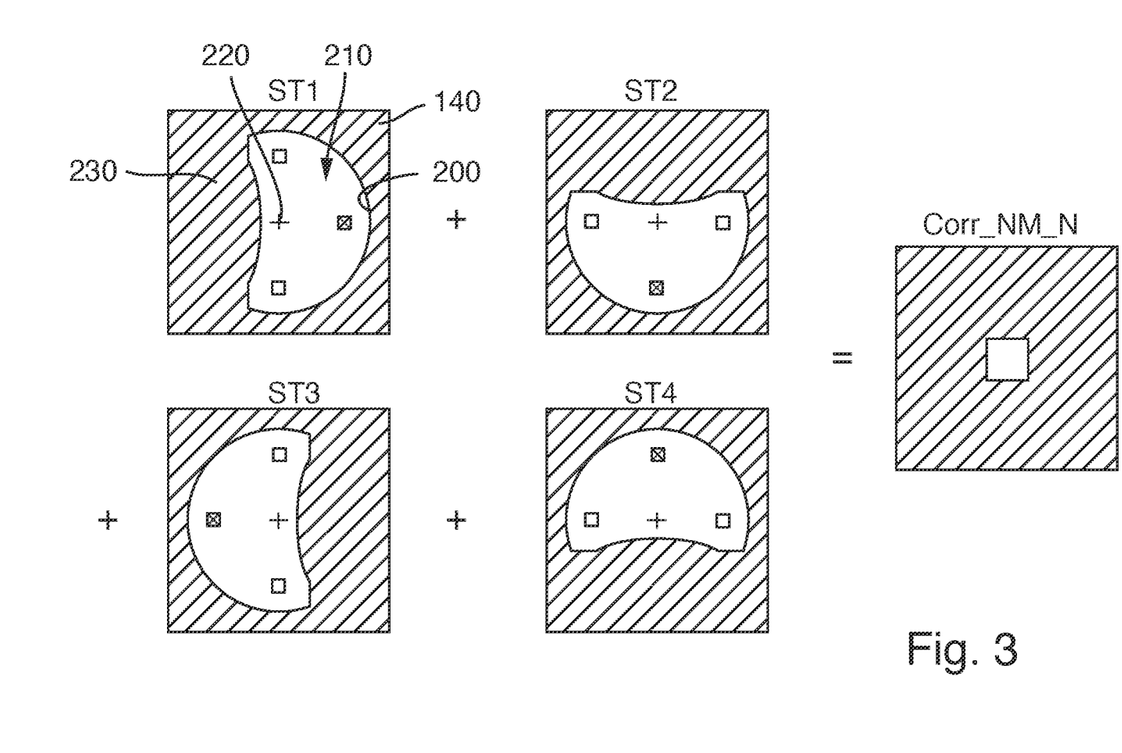
FIG. 3 illustrates the mediation effect of the M-th order waviness in a prior art method and problems when testing off-axis apertures.

The resulting averaging problem in the case of an off-axis N+M method will be explained with reference to FIG. 3. FIG. 3 schematically shows a plan view of the surface to be measured of a test object 200, this surface having a circular outer boundary, the center of which is used as test object rotation axis 220. Eccentrically with respect to the center, a cutout 230, which can also be embodied as a perforation, is provided in the mirror in the case of the example. The small square symbols represent an exemplary 4th order waviness from an N-cycle, and the crosses represent an exemplary 3rd order waviness from an M-cycle.

FIG. 3 clearly shows the mediation effect of the M-th order waviness (in this case for M=3). The sub-figures ST1, ST2, ST3 and ST4 show four rotational positions—offset azimuthally in each case by 90°—of a test object 200 in the form of a mirror having a cutout 230 situated outside the center (test object rotation axis 220). In addition, the sub-figure Corr_NM_N reveals the problem when the invalid image regions are duplicated. In the case of other averaging methods (e.g. ones in which the values in the invalid regions are artificially set to "0"), edges nevertheless arise at the region boundaries and corrupt the result. For this reason, the traditional N+M method only functions well for whole-area on-axis apertures.

At this juncture, reference will be made briefly to the method described in DE 10 2017 217 371 A1. This method is suitable for correcting test set-up errors over the whole area. The procedure employed there is also referred to as "iterative stitching" in the present application, since different measurement results are computed with one another in an iterative method. There, too, the method begins with the recording of the necessary measurement data. In that case, only a single measurement cycle with a corresponding number of N rotational positions is usually recorded. The number of individual measurements of this cycle is generally significantly greater than in the N+M method just described. The method does not enable test object errors with N-th order waviness and test set-up errors with N-th order waviness to be separated from one another.

Figure 4:
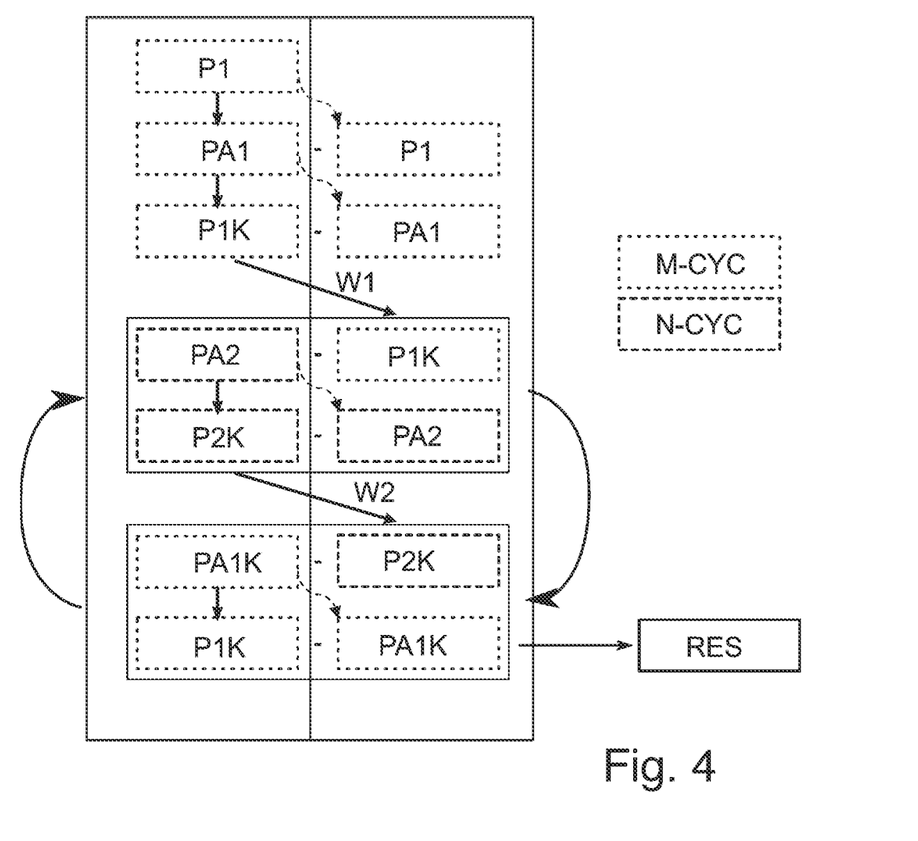
FIG. 4 schematically shows a sequence of method steps of an evaluation operation in one embodiment of the invention.

The method in accordance with the claimed invention affords an improvement here. One exemplary embodiment is explained with reference to the schematic diagram in FIG. 4. FIG. 4 schematically shows a sequence of method steps of an evaluation operation used to evaluate the measured values captured with different rotational positions. The text fields bounded by short-dashed lines (designated by M-CYC on the right) relate to an M-cycle, i.e. the measurement series with M measured values. The latter is also referred to here in a generalized manner as first measurement series with M first measurements. Reference sign N-CYC correspondingly denotes an N-cycle associated with the second measurement series with N measured values (second measured values). The associated text fields are bounded by long-dashed lines. The curved arrows that laterally connect blocks in the lower part of the diagram indicate the iterative character of the evaluation method.

In order that the conventional N+M method can be applied to off-axis systems, particular steps are carried out during the evaluation in order to separate the test object errors and test set-up errors with N-th order waviness and M-th order waviness from one another. That means here that the influence of the test set-up error for all relevant measurement points on the surface to be tested can be reconstructed by an iterative procedure.

The test method begins with the recording of the measured values in the manner as described by way of example for the traditional N+M method with reference to FIG. 2. Therefore, in a first measurement series for example for M rotational positions, interferograms correspondingly recorded there are captured and first measured values are derived therefrom. It is sufficient to record an N rotational position cycle and M rotational position cycle with equidistant rotational positions of rotation.

Differences with respect to the known N+M method which make it possible also to test off-axis systems with regard to their surface shape on the basis of this method take place in the evaluation.

The exemplary method in FIG. 4 begins with an iteration, carried out here by way of example in the M-cycle. In this case, firstly a first figure P1 is calculated on the basis of the first measurements (for M rotational positions). As considered illustratively, the first figure is a common concomitantly rotating figure of the first measurement series. In this case, it is assumed that those errors which occur at the corresponding location in the corresponding rotational position for each rotational position are associated with the (rotated) test object and not with the (stationary) test set-up. This first figure P1 is, as it were, a first approximation to the figure that is actually to be determined, i.e. the surface shape of the test object.

The next step involves calculating the first test set-up error PA1 containing the common non-concomitantly rotating errors of the first measurement series. For this purpose, the first figure P1 determined above is subtracted from the first measured values. In other words, the errors concomitantly rotating with the test object are subtracted from the errors not concomitantly rotating with the test object and these are assigned to the test object and the test set-up, respectively.

The first test set-up error PA1 determined in this way is then used to calculate a corrected first figure P1K in the next method step. This corrected first figure arises from the first figure P1 by subtraction of the first test set-up error PA1. This result, i.e. the corrected first figure P1K, then still contains the test object error with M-th order waviness and the test set-up error with M-th order waviness because the underlying raw data, i.e. of the first measured values, at M rotational positions are present.

In order then to separate the errors with M-th order waviness from the errors with N-th order waviness, the reconstructed test object error, i.e. the corrected first figure P1K, containing the M-th order waviness is introduced into the corresponding reconstruction of the N rotational position cycle N-CYC. This change to the other cycle is symbolized by the oblique arrow W1. In the image in FIG. 4, the corrected first figure P1K is thus subtracted from the second measured values, i.e. from the raw data of the N-cycle. As a result, a second test set-up error PA2 is determined on the basis of the measured values of the N-cycle. In the subsequent method step, the second test set-up error is used to calculate a corrected second figure P2K. The latter arises from the raw data of the second measurement series (second measured values) by taking into account the second test set-up error.

After this reconstruction of the N rotational position cycle, this reconstruction result (namely the corrected second figure P2K) is introduced again as correction into the reconstruction of the N rotational position cycle, which is symbolized by the oblique arrow W2. This method step leads to suppression or correction of the test object errors with N-th order waviness.

The corrected second figure P2K is then used for correcting the first test set-up error PA1 by subtracting the corrected second figure P2K from the raw data of the N-cycle, i.e. from the first measured values. The corrected first test set-up error PA1K resulting therefrom then still contains only the common waviness errors of the first measurement series and of the second measurement series, i.e. of both the M-cycle and the N-cycle.

With the iterative application of this method, the test object and test set-up errors with M-th order waviness and N-th order waviness are separated from one another better and better, such that ideally only the common multiples, i.e. N*M, as in the traditional N+M method, remain in the final result. The algorithm gradually approaches the final result. The calculation can be ended if a comparison of the result respectively attained with a convergence criterion shows that the convergence criterion is satisfied. Otherwise, there would be at least one more pass through the iteration loop.

Only the common multiples, i.e. N*M, still remain in the final result RES, which in this respect corresponds to the traditional N+M method. By virtue of the fact that, however, in the case of the present method, the reconstruction now involves performing iterative mutual computation of the results of the two cycles with different wavinesses (iterative stitching), the correction of the N-th and M-th order wavinesses can take place on the entire area swept by the test object, thus resulting in no duplication of the invalid image regions or averaging edges (as illustrated in FIG. 3).

What is claimed is:

1. A method for characterizing the surface shape of an optical surface of an optical element, wherein
   the optical element is incorporated as a test object in an interferometric test device such that the surface is arranged completely within a measurement region of the test device,
   a plurality of interferometric measurements are carried out on the test object, and
   between the measurements a rotational position of the test object relative to the test device is changed by limited rotation of the test object about a test object rotation axis, and wherein
   in order to form a first measurement series with first measurements, M first measured values are captured for M rotational positions with a rotation angle difference of 360°/M and in order to form a second measurement series, N second measured values are captured for N rotational positions with a rotation angle difference of 360°/N, where M and N are relatively prime natural numbers, and
   in an evaluation operation, measured values are evaluated jointly in order to ascertain shape information for characterizing the surface shape of the optical surface,
wherein the evaluation operation, in an iterative process, comprises:
(A) calculating a first figure based on the first measurements, wherein the first figure is a common concomitantly rotating figure of the first measurement series;
(B) subtracting the first figure from the first measured values in order to determine a first test set-up error containing common non-concomitantly rotating errors of the first measurement series;
(C) using the first test set-up error for calculating a corrected first figure, which results from the first figure by subtraction of the first test set-up error;
(D) subtracting the corrected first figure from the second measured values in order to determine a second test set-up error;
(E) using the second test set-up error for calculating a corrected second figure, which results from the second measured values by taking into account the second test set-up error;
(F) using the corrected second figure for correcting the first test set-up error by subtracting the corrected second figure from the first measured values in order to determine a corrected first test set-up error containing common non-concomitantly rotating errors of the first measurement series and of the second measurement series;

(G) using the corrected first test set-up error for calculating a first figure corrected once again; and (H) comparing the result with a convergence criterion and optionally repeating steps (A) to (H) depending on a result of the comparison.

2. The method according to claim 1, wherein the test object is a mirror, the mirror having a reflective surface, a surface area of which has no rotational symmetry with respect to an axis of symmetry.

3. The method according to claim 2, wherein the mirror has an eccentric perforation.

4. The method according to claim 1, wherein three or more measurement series are carried out and results thereof are computed with one another.

5. A device for characterizing the surface shape of an optical surface of an optical element comprising one or more processors, wherein the one or more processors are configured to carry out the method according to claim 1.

* * * * *